United States Patent [19]

Kirlin et al.

[11] Patent Number: 4,910,716

[45] Date of Patent: Mar. 20, 1990

[54] SUPPRESSION OF COHERENT NOISE IN SEISMIC DATA

[75] Inventors: Rodney L. Kirlin, British Columbia, Canada; William J. Done, Tulsa, Okla.

[73] Assignee: Amoco Corporation, Chicago, Ill.

[21] Appl. No.: 304,547

[22] Filed: Jan. 31, 1989

[51] Int. Cl.⁴ .............................................. G01V 1/36
[52] U.S. Cl. ......................................... 367/24; 367/46
[58] Field of Search ....................... 367/21, 24, 38, 43, 367/46; 364/421

[56] References Cited

U.S. PATENT DOCUMENTS 4,397,006  8/1983  Galbraith, Jr. ........................ 367/40
4,468,761  8/1984  Kietsch ................................. 367/43

OTHER PUBLICATIONS

"Applications of Full an Partial Karhunen—Loeve Transformation to Geophysical Image Enhancement", Marchisio et al., 58th Annual Soc. Explor. Geophys. Mtg., 10/88.
"New Image Reconstruction Technique for S/N Enhancement in Seisnic Data," Agouridis et al., 58th Annual Soc. Explor. Geophy. Int. Mtg., 10/88.
"S/N Ratio Enhancement in Multichannel Seismic Data via the KLT," Jones et al., Geophysical Prospety, vol. 35, #1, pp. 12-32, 1987.

Primary Examiner—Thomas H. Tarcza
Assistant Examiner—Ian J. Lobo
Attorney, Agent, or Firm—Scott H. Brown; Fred E. Hook

[57] ABSTRACT

A method is disclosed to suppress coherent noise in seismic data. Based on the Karhunen-Loeve Transform, this method trains on a region containing undesired coherent noise. Eigenvectors determined from the convariance matrix of that noise are used to reconstruct the noise throughout the data set. Subtracting the reconstruction from the original data leaves a residual in which the coherent noise has been suppressed. Applying this method to a shot record of marine seismic data illustrates that the procedure does suppress noise on actual seismic data.

7 Claims, 8 Drawing Sheets

SUPPRESSION OF COHERENT NOISE IN SEISMIC DATA

BACKGROUND OF THE INVENTION

1. Field of the Invention

The present invention relates to a method of suppressing coherent noise in seismic data and, more particularly, to a method that utilizes an eigendecomposition of the seismic data.

2. Setting of the Invention

Coherent noise arising from the seismic energy source(s) or other sources is frequently a problem in seismic exploration. This resulting coherent noise can manifest itself in the record of seismic data in a variety of forms, depending on the type of energy source utilized, subsurface structures, rock mechanics, etc. Usually, the coherent noise will appear as an ever increasing zone of impinging bands of off-axis signals that obscure the meaningful reflections. For example, in marine seismic records, this coherent noise can appear as a succession of chevron-shaped bands or possible "back scatter" of the source energy.

Numerous techniques have been developed in the past for improving the signal-to-noise ratio in a seismic data record. One very useful technique involves the use of a principal component analysis method called the Karhunen-Loeve Transform (KLT), which is well known to those skilled in the art, as illustrated by the following articles:

M. J. Greenacre, *Theory and Applications of Correspondence Analysis*, Academic Press, New York, 1984.

L. L. Scharf and D. W. Tufts, "Rank Reduction for Modeling Stationary Signals," IEEE Trans. on Acoust., Speech, and Signal Proc., Vol. ASSP-35, No. 3, March 1987, pp. 350-355.

C. Hemon and D. Mace, "The Use of the Karhunen-Loeve Transformation in Seismic Data Processing," Geophysical Prospecting, Vol. 26, 1978, pp. 600-626.

I. F. Jones, "Applications of the Karhunen-Loeve Transform in Reflection Seismology," PhD Thesis, Department of Geophysics and Astronomy, University of British Columbia, April 1985.

The Karhunen-Loeve Transform (KLT) has been applied to a variety of seismic data processing problems, including stacking, multiple suppression, and velocity analysis. The KLT was developed as the optimum solution to a mean squared error problem based on the reduced rank modeling of a signal. A discussion of the method of reduced rank modeling of signals and several examples of applications can be found in the Scharf and Tufts article above.

Seismic applications of the KLT typically have involved using a subset of the principal components obtained from the KLT of a seismic data set to reconstruct the data. If the dominant principal components are used to reconstruct the data, the result emphasizes the lateral coherence which characterizes seismic data. Using the subdominant principal components can emphasize detail in data by leaving out the strong lateral information contributed by the dominant principal components. However, the data vectors used in the KLT in the past span only a one-dimensional pattern, such as the elements from a certain number of traces at a fixed sample time.

Since coherent noise in seismic data takes the form of two-dimensional patterns, such as exhibiting spatial and temporal coherency, the use of the one-dimensional KLT has been found to have limitations. Thus, there is a need for a method of suppressing coherent noise in seismic data that utilizes the benefits of the KLT and the two-dimensional coherencies present in the data.

SUMMARY OF THE INVENTION

The present invention has been developed to overcome the foregoing deficiencies and meet the above described needs. Specifically, a method and related system are disclosed herein whereby the KLT is used to suppress coherent noise, land or marine, in seismic data. The earlier uses of the KLT have attempted to eliminate the undesirable noise by computing the principal components of the noise based on the entire seismic data record and then reconstructing the data with a subset of the principal components. In the present invention, the KLT is applied to a training region of the seismic data consisting primarily of the noise to be suppressed. Using the dominant principal components of this training region to reconstruct the entire seismic data record produces an estimate of the undesired coherent noise throughout the seismic record. Subtracting this reconstruction from the original seismic data record leaves a residual in which the undesired noise components have been reduced.

DETAILED DESCRIPTION OF THE PREFERRED EMBODIMENTS

Figure 1:
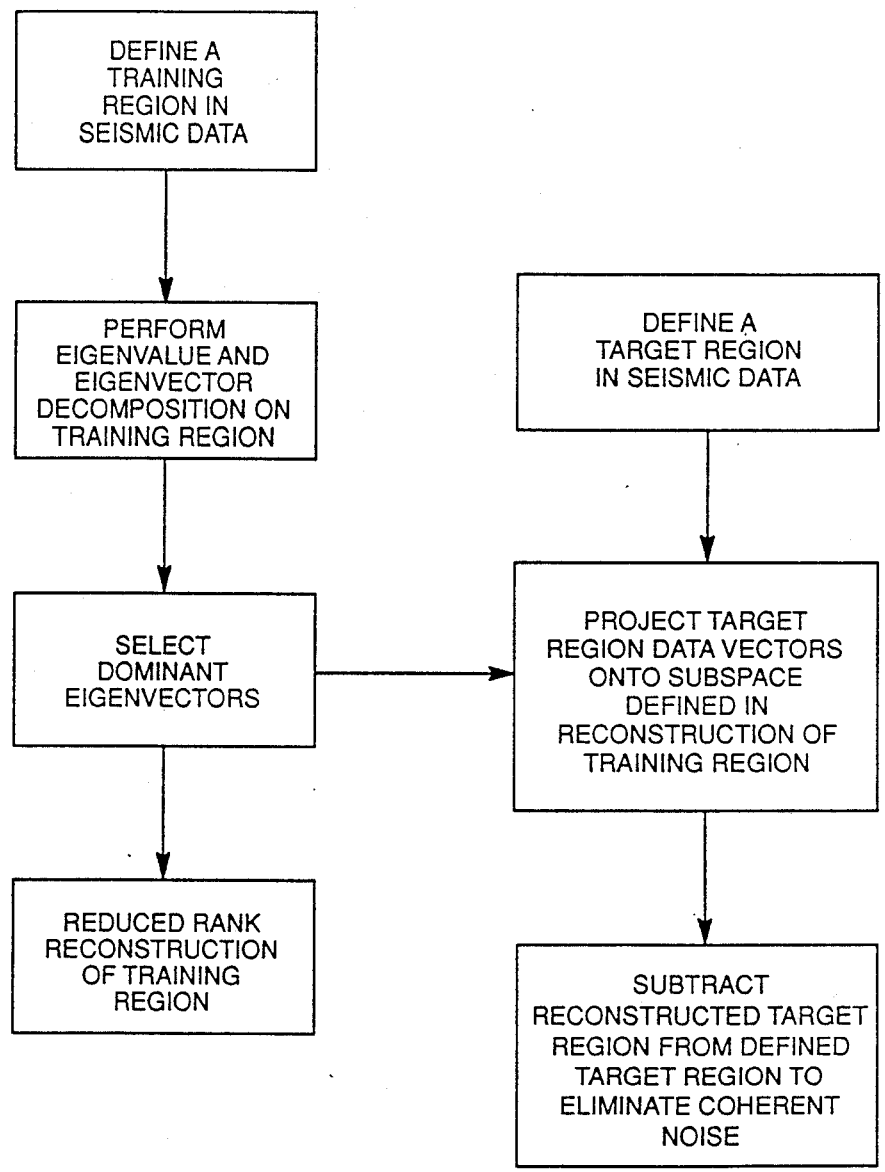
FIG. 1 is a block of flow charts illustrating the principal steps of a method of suppressing coherent noise in seismic data which embodies the present invention.

Before a detailed description is provided of the method and system of the present invention, a brief review of the Karhonen-Loeve Transform (KLT) will be provided.

Assume a set of N real vectors $x_k$, $k=0, \ldots, N-1$, where each vector is Mx1. Further assume that Mx1 transform vectors $a_i$ exist such that $$y_{ki} = [x_k - \mu]' a_i, \quad i=1, \ldots, M. \quad (1)$$

where ' denotes the matrix transpose operation and $\mu$ is the vector mean of the N vectors $x_k$ $$\mu = \frac{1}{N} \sum_{k=0}^{N-1} x_k. \quad (2)$$

It is assumed that one can generate the vector $x_k$ from $y_{kj}$ using a set of Mx1 vectors $b_j$ according to $$x_k = \mu + \sum_{j=1}^{M} y_{kj} b_j. \quad (3)$$

Equations (1) and (3) are the forward and inverse transform relations of the KLT. As will be seen, the basis functions $a_i$ and $b_j$ are data dependent. A reduced rank approximation to $x_k$ is generated using a subset of the $y_{kj}$, say the first m terms, $m \leq M$, according to $$\widehat{x_k} = \mu + \sum_{j=1}^{m} y_{kj} b_j. \quad (4)$$

The Mx1 vector error associated with this reduced rank approximation of $x_k$ is $$e_k = x_k - \widehat{x_k}. \quad (5)$$

Forming the quadratic $$J(m) = \frac{1}{N-1} \sum_{k=0}^{N-1} e'_k e_k, \quad (6)$$

the $a_i$ and $b_i$ vectors in (1) and (4) which minimize (6) are given by $$a_i = b_i = u_i, \quad (7)$$

$i = 1, \ldots, M$. In (7) $u_i$ is the $i^{th}$ column of matrix U, defined by $$R = U \; U. \quad (8)$$

The columns of U are the normalized eigenvectors of R. R is the average covariance matrix of the data vectors $x_k$. The elements of the diagonal matrix $\Lambda = \text{diag}[\lambda_1, \ldots, \lambda_M]$ are the eigenvalues of R, arranged in descending order by the appropriate construction of U:

$$\lambda_1 \geq \lambda_2 \geq \ldots \geq \lambda_M. \quad (9)$$

The real, symmetric, MxM matrix R is given by $$R = \frac{1}{N-1} \sum_{k=0}^{N-1} [x_k - \mu][x_k - \mu]'. \quad (10)$$

Equation (1), with $a_i = u_i$, is the projection of data vector $x_k$ on to eigenvector $u_i$. Assembling the projections on $u_i$ for all $x_k$ gives the terms comprising $y_{ki}$, commonly referred to as the $i^{th}$ principal component of the data $x_k$, $k = 0, \ldots, N-1$. If the eigenvalues are ordered as in (9), then the first order principal component $y_1 = [y_{01} \; y_{11} \; \ldots \; y_{N-1,1}]'$ contains the greatest amount of energy, which is equal to $\lambda_1$.

The data $x_k$ can be reconstructed using (3) with $b_j = u_j$. The reduced rank reconstruction in (4) is used in the following section to emphasize the structure of the coherent noise which is to be suppressed.

The novel use of the KLT to suppress coherent noise in seismic data can be summarized below and is shown in FIG. 1.

(1) Specify a training region which is predominantly coherent noise.
(2) Break the training region into KxL data blocks, each block forming a (KL)x1 data vector. Typical values for the product of K and L are 4 to 25, the upper limit determined primarily by computer restrictions on memory and computational speed.
(3) Using the data vectors from step (2), compute the covariance matrix R according to equation (10).
(4) Perform an eigenvalue/eigenvector decomposition of R and select the subset of eigenvectors corresponding to the most dominant eigenvalues. Which eigenvectors are selected can be determined according to the total energy contributed by their corresponding eigenvalues or, most commonly, a visual examination of the resulting output in step (8) below.
(5) Reconstruct the training region using the selected eigenvectors and equations (1) and (4), which is a reduced rank reconstruction of the training data.
(6) Designate a desired target region having coherent noise to be suppressed. Typically this is an entire seismic record, but subsection of the record may be specified as the target region. The seismic record may be a common receiver gather, common receiver gather, common midpoint gather, or any other organization of the seismic data which strongly presents the noise to be suppressed. Divide the target region into KxL data blocks, forming a data vector from each.
(7) Use the dominant training region eigenvectors selected in steps (4) and (5) to reconstruct the data blocks, again using equations (1) and (4). This step projects the seismic data onto the subspace determined by the reduced rank model for the coherent noise.
(8) Obtain the residual signal by subtracting the reconstructed target region obtained in step (7) from the original target region data.

The residual obtained from step (8) is the desired output which is the part of the original target data lying out of the subspace of the reduced rank noise model. The purpose of the training region can now be seen to force the coherent noise to be strongly associated with the dominant axes of the coordinate space determined by the eigenvectors of R.

The residual data can exhibit an artifact caused by dividing the target region into the small, adjacent blocks. This artifact causes a strong visual correlation between output traces common to a column of data blocks. An abrupt change between the boundaries of adjacent blocks, especially in the trace direction, causes a degradation in the appearance of the output data. This phenomenon is similar to the edge which occurs when using the KLT to encode portions of images. The inventors hereof have found that by overlapping adjacent data blocks, in the trace and/or time directions, this artifact is reduced. A data value in the reconstructed target region is the average of all elements which correspond to that data value taken from the reconstructed target region vectors in which that element is found and this averaging process smooths out the boundaries between data blocks.

In the previous seismic applications of the KLT the vector $x_k$ contains the seismic samples from M traces at time k and M can be quite large for typical applications. For example, if the previous methodology of the KLT is used on stacked data, M can be on the order of several hundred. The size of M impacts the computational requirements necessary for the computation and the singular value decomposition of matrix R. The method as applied for the coherent noise suppression algorithm described herein results in small values of M, typically between 4 and 25, thereby being much more computationally efficient. The upper limit of 25 is a restriction imposed only by computer memory and computational restraints.

Another difference between this method and previous seismic applications of the KLT is the shape of the data block from which the data vectors are formed. In this application the elements forming the data vector cover a two-dimensional pattern, a rectangle spanning space and time. The elements in the data vectors previously used span only a one-dimensional pattern, the elements from M traces (space) at a fixed sample time. As will be seen in the example in the next section, using a two-dimensional pattern allows the dominant eigenvectors from the covariance matrix of the training region to adequately reconstruct the coherent noise.

Figure 2:
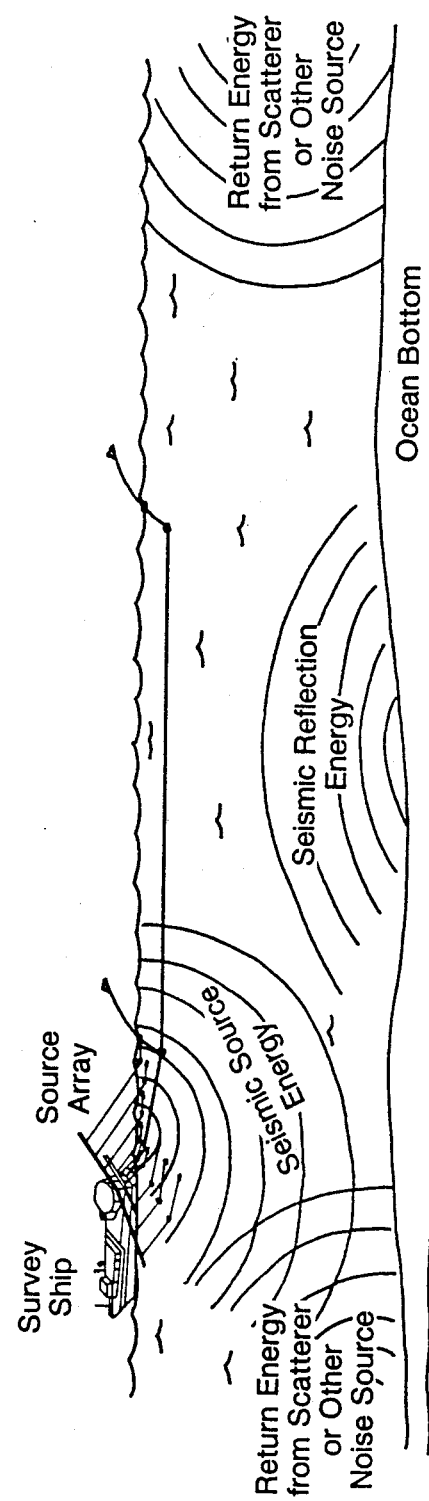
FIG. 2 is a semi-diagrammatic representation of a marine seismic data collection scheme with signal and coherent noise sources indicated.

The ability of this technique to suppress coherent noise will be demonstrated on a common shot record of marine seismic data. FIG. 2 shows an example of the data acquisition geometry of a marine seismic survey. Towing a cable containing hydrophones, at regular intervals the survey vessel activates the seismic energy source towed behind the vessel. The energy source is actually an array of sources, usually air or water guns. Within the cable, the signals from adjacent hydrophones are combined to form a composite signal which is transmitted down the cable for recording on the survey vessel. For example, the cable may be constructed so that the signals from each of three adjacent hydrophones, with a separation between hydrophones of 1 meter, are combined to form one signal. This construction forms a three element array which suppresses random noise generated by pressure variations along the towed cable. Energy from the source array penetrates the earth and is reflected back toward the surface from interfaces within the subsurface. This reflection energy creates pressure waves in the water layer which are detected by the hydrophones and recorded. Also shown in FIG. 2 are pressure waves traveling horizontally in the water layer. These represent sources of noise impinging on the cable and are present in the example to be shown.

Figure 3:
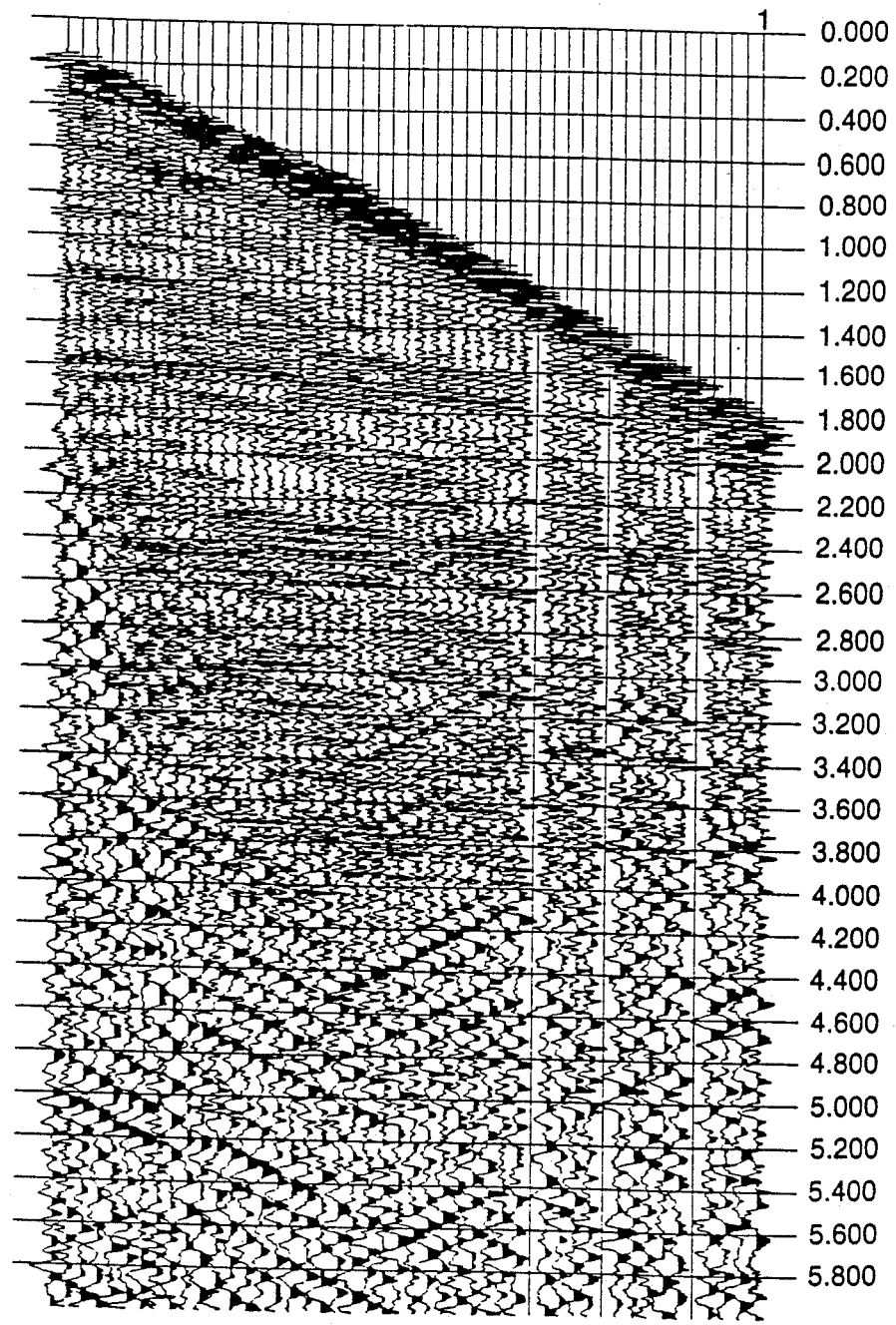
FIG. 3 is a seismic trace record of marine seismic data containing coherent noise to be suppressed.

FIG. 3 shows one common shot record of marine seismic data. It shows the response of the 48 channels being recorded to a single firing of the source array. It is 230 m from the source location to the nearest hydrophone group and 2580 m to the farthest. A total of 48 regularly spaced channels from the cable are retained, giving a separation of 50 m between channels. Information on the type of marine source and the source array configuration are not available. This data has had an agc process applied in which the values of the data within a sliding window 1 sec in length are adjusted so that the output has constant mean square value within the window. The automatic gain control (agc) process was applied prior to plotting and analysis by the noise suppression procedure described in the previous section.

Beginning at about 4.0 sec, the seismic reflection data becomes obscured by interfering coherent energy. Arriving at the receivers in the recording cable from two directions, this coherent noise forms a chevron-like pattern on the data. One possible source for this noise is backscattering of the survey vessel's source energy from subsurface structure or large objects in the water, such as drilling platforms. Another possibility is the proximity of other vessels generating noise which overcomes the lower amplitude seismic reflections arriving later in the data.

Figure 4A:
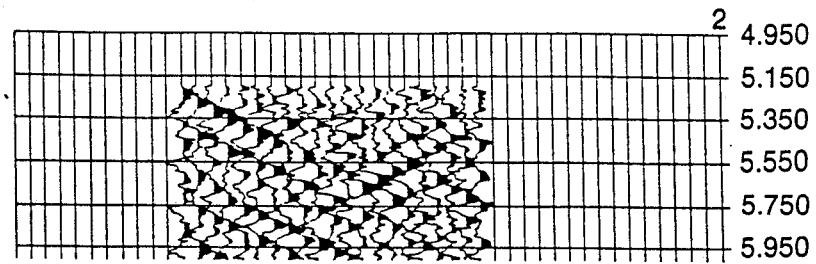
FIG. 4a is a seismic trace record of the training zone selected on the coherent noise from FIG. 3.
Figure 4B:
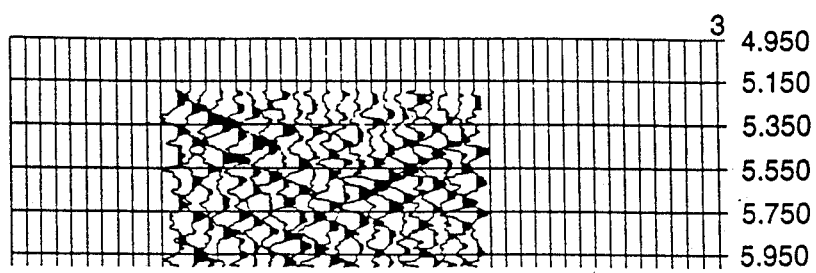
FIGS. 4b and 4c are two reconstructions of the training zone of FIG. 4a utilizing the dominant eigenvectors as determined from the training zone data covariance matrix.
Figure 4C:
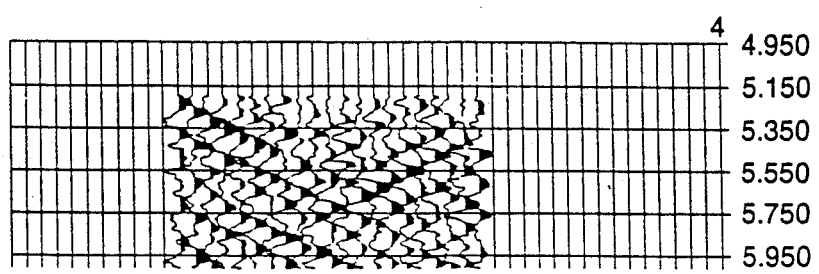

The training region data chosen to be used is shown in FIG. 4, part (a), and the target region consists of all data greater than 3 sec. The training region is divided into data blocks covering 3 traces and 2 time samples, and in test 1, the data blocks do not overlap, resulting in 700 data blocks being defined in the training region. Test 2 allows the data blocks to overlap adjacent blocks by one element in the trace and time directions. With overlapping, 2000 data blocks are extracted from the training region. The eigenvalues obtained from the covariance matrix R for these two tests are shown in Table 1.

TABLE 1

| | Eigenvalues from Marine Data | |
|---|---|---|
| Order | Test 1 | Test 2 |
| 1 | 419123. | 403433. |
| 2 | 298751. | 307242. |
| 3 | 155691. | 157946. |
| 4 | 10186. | 10405. |
| 5 | 9116. | 8953. |
| 6 | 7864. | 8023. |

In either case, the first three eigenvalues are an order of magnitude or more larger than the remaining eigenvalues. Because the coherent noise arrives from two directions, the reconstruction of the training data should be attempted using the two or three most dominant eigenvectors.

FIG. 4 shows an isolated view of the training region from the input data in part (a) hereof. The training region as reconstructed using the two most dominant eigenvectors from Tests 1 and 2 are shown in parts (b) and (c), respectively.

Figure 5A:
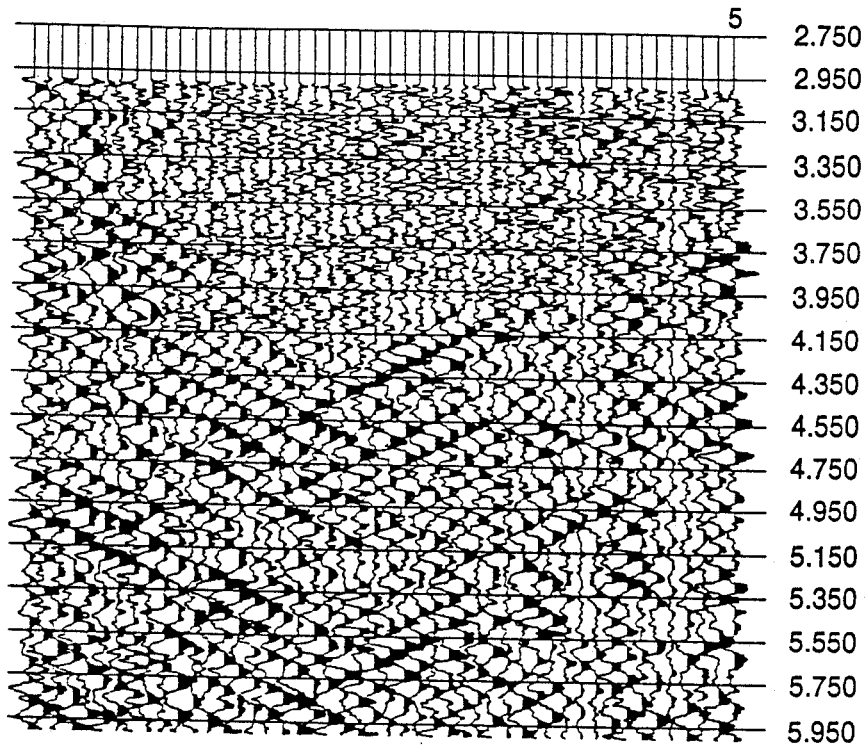
FIG. 5a is a seismic trace record illustrating the estimate of the coherent noise in the target region as determined from the results of FIG. 4b.
Figure 5B:
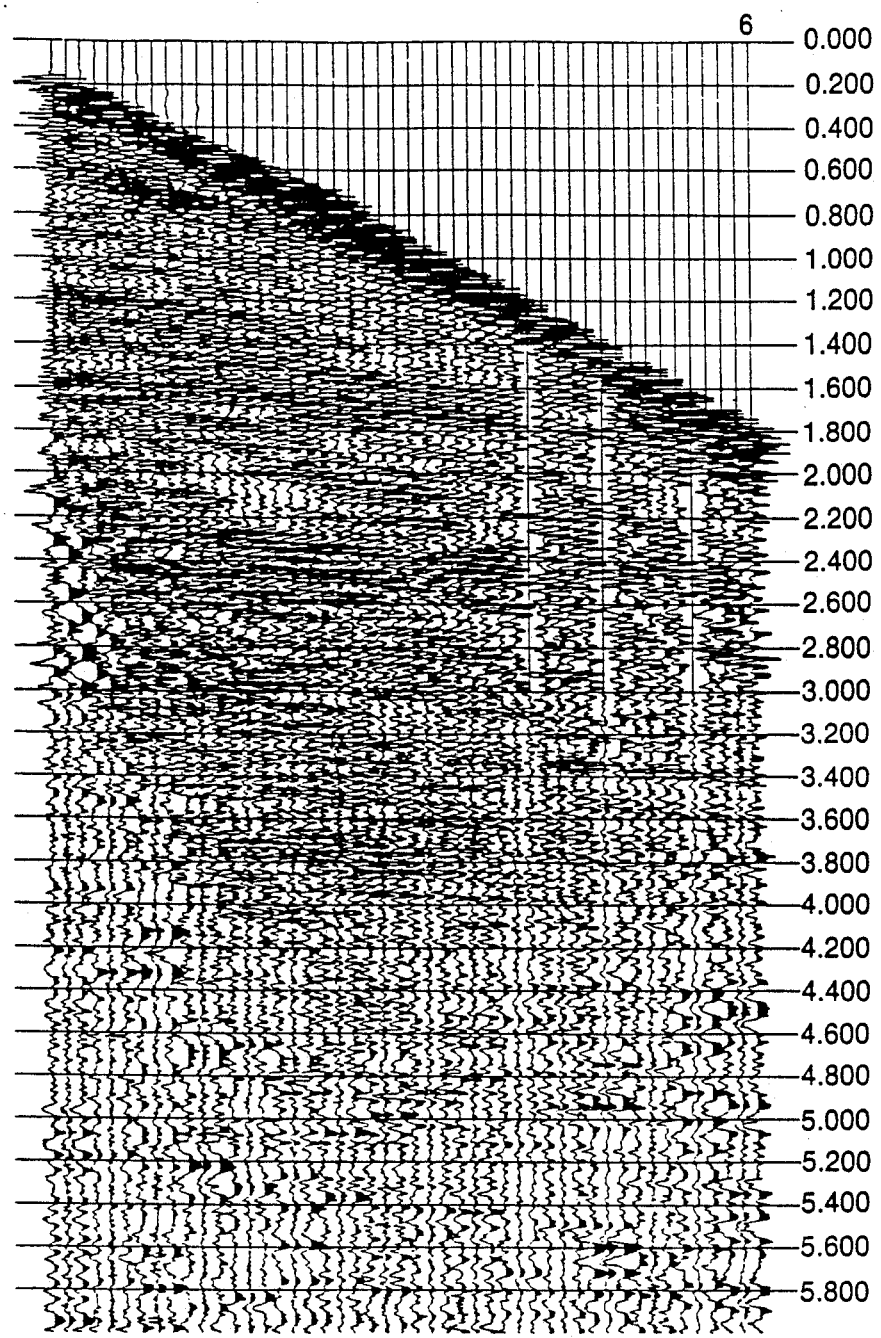
FIG. 5b is a seismic trace record after subtracting results of the estimate of the coherent noise of FIG. 5a to suppress the coherent noise.

Either reconstruction of the training noise is visually accurate, with the overlapped data blocks in Test 2 producing a slightly smoother appearing reconstruction. The reconstructed target and resulting residual for Test 1 are shown in FIG. 5, parts (a) and (b), respectively wherein the offending coherent noise has been clearly suppressed.

Figure 6A:
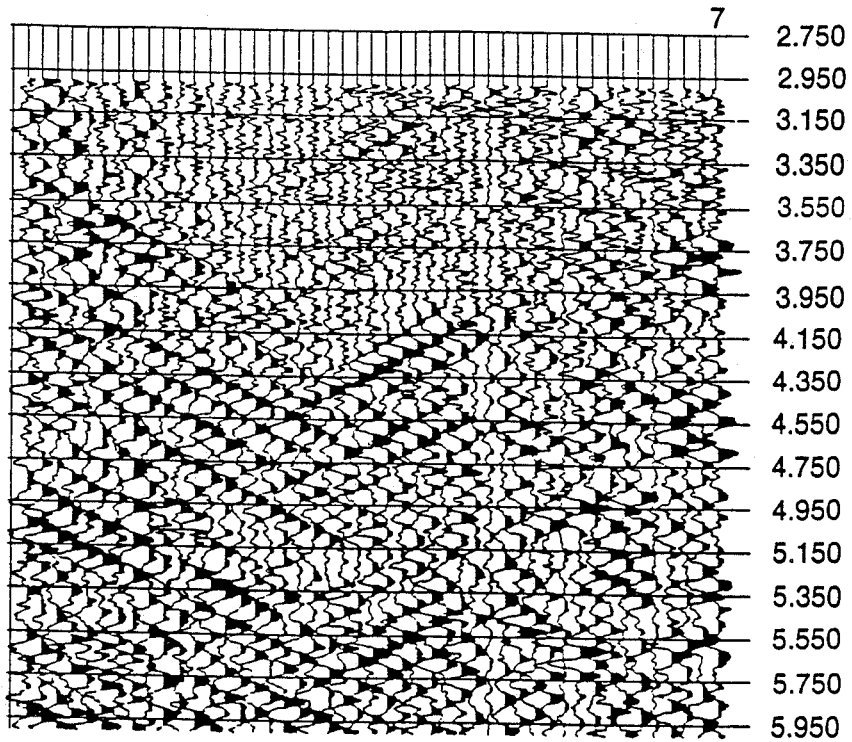
FIG. 6a is a seismic trace record illustrating the estimate of the coherent noise in the target region as determined from the results of FIG. 4c.
Figure 6B:
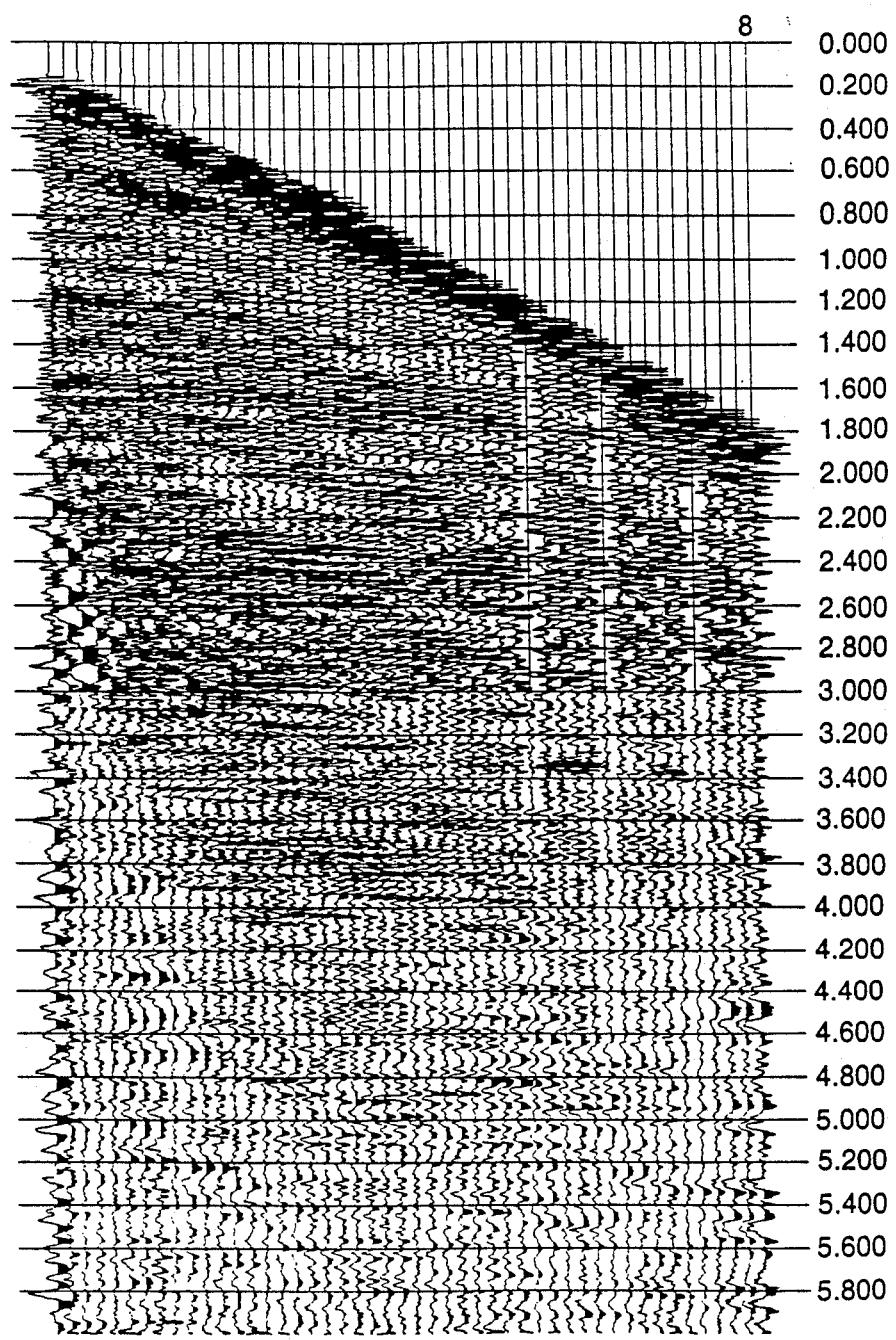
FIG. 6b is a seismic trace record after subtracting the results of the estimate of the coherent noise of FIG. 6a to suppress the coherent noise.

FIG. 6 contains the results for the overlapping data blocks used in Test 2. Comparing FIGS. (5b) and (6b) to the input data in FIG. 3, it can be seen that the coherent noise below 3 sec (the target zone) has been suppressed. The Test 2 result with overlapping data blocks tends to have smoother transitions between the seismic traces. With the suppression of the coherent noise, the hyperbolic seismic arrivals are more visible below 3 sec. Interpretation of this data should be done with caution, as with any technique which causes lateral mixing of seismic traces. The danger is that the lateral mixing can create false events or smooth over fine features. But with this method, the smearing is limited to a known number of traces determined by the data block size and amount of overlap. Another benefit of this technique is the reconstruction of data on the three dead traces present in this record of data. As a result, this technique can be used as a trace interpolation procedure. Wherein the present invention has been described in particular relation to the drawings attached hereto, it should be understood that other and further modifications, apart from those shown or suggested herein, may be made within the scope and spirit of the present invention.

What is claimed is:

1. A method of suppressing coherent noise in seismic data comprising:
    (a) defining a training region in the seismic data which comprises primarily coherent noise to be operated on;
    (b) determining eigenvectors corresponding to dominant eigenvalues of data within the training region to form a subspace determined by a set of the eigenvectors;
    (c) defining a target region comprising a portion of or all of the seismic data within which coherent noise is to be suppressed;
    (d) projecting target region data onto the subspace determined by step (b) to define reconstructed target region data; and
    (e) subtracting the reconstructed target region data from the target region data of step (c) to suppress coherent noise in the target region.

2. The method of claim 1 wherein step (b) comprises:
    forming data vectors for each of a plurality of blocks of data,
    decomposition of a covariance matrix formed from the data vectors, and
    selecting a subset of eigenvectors corresponding to at least one dominant eigenvalue.

3. The method of claim 2 wherein the subset of eigenvectors corresponds to at least two dominant eigenvalues.

4. The method of claim 2 wherein the blocks of data are distinct in the trace direction.

5. The method of claim 4 wherein the blocks of data are distinct in the time direction.

6. The method of claim 2 wherein the blocks of data overlap in the trace direction.

7. The method of claim 6 wherein the blocks of data overlap in the trace direction.

* * * * *